(12) United States Patent
Yun

(10) Patent No.: US 11,760,326 B2
(45) Date of Patent: Sep. 19, 2023

(54) ELECTROMECHANICAL BRAKING APPARATUS

(71) Applicant: HYUNDAI MOBIS CO., LTD., Seoul (KR)

(72) Inventor: Seung Hyun Yun, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 238 days.

(21) Appl. No.: 17/154,219

(22) Filed: Jan. 21, 2021

(65) Prior Publication Data

US 2021/0253073 A1    Aug. 19, 2021

(30) Foreign Application Priority Data

Feb. 17, 2020    (KR) .......................... 10-2020-0018874

(51) Int. Cl.
*B60T 13/14*    (2006.01)
*B60T 11/10*    (2006.01)
(Continued)

(52) U.S. Cl.
CPC .............. *B60T 13/143* (2013.01); *B60T 7/04* (2013.01); *B60T 11/102* (2013.01);
(Continued)

(58) Field of Classification Search
CPC .... B60T 11/102; B60T 13/161; B60T 13/143; B60T 7/04; B60T 11/165; B60T 11/18; B60T 2201/03; B62L 1/00
See application file for complete search history.

(56) References Cited

U.S. PATENT DOCUMENTS 4,422,694 A * 12/1983 Schopper .............. B60T 11/323
303/84.2
5,410,880 A * 5/1995 Schluter ................ B60T 13/565
92/128
(Continued)

FOREIGN PATENT DOCUMENTS

CN    202851705 U    4/2013
CN    103857572 A    6/2014
(Continued)

OTHER PUBLICATIONS

WO2014012702A1 (Year: 2014).*
(Continued)

*Primary Examiner* — Robert A. Siconolfi
*Assistant Examiner* — Mahbubur Rashid
(74) *Attorney, Agent, or Firm* — Morgan, Lewis & Bockius LLP

(57) ABSTRACT

The present disclosure in at least one embodiment provides an electromechanical braking apparatus including a rod configured to translate in response to a depression of a brake pedal, a master cylinder configured to receive brake oil and to be responsive to insertion of the rod for discharging the brake oil, a motor, and a gear mechanism having at least some part connected to the master cylinder and at least some other part connected to the motor, wherein the gear mechanism including an upper housing configured to receive at least some portion of a plurality of gears, and a lower housing coupled to the upper housing and configured to receive at least some other portion of the plurality of gears.

14 Claims, 4 Drawing Sheets

(51) Int. Cl.
  *B60T 11/18* (2006.01)
  *B60T 11/16* (2006.01)
  *B60T 7/04* (2006.01)

(52) U.S. Cl.
  CPC ............ *B60T 11/165* (2013.01); *B60T 11/18* (2013.01); *B60T 2201/03* (2013.01)

(56) References Cited

U.S. PATENT DOCUMENTS

| | | | | |
|---|---|---|---|---|
| 6,295,919 | B1* | 10/2001 | Leboisne | B60T 13/5675 60/582 |
| 6,755,117 | B2* | 6/2004 | Vermoesen | B60T 13/563 92/169.2 |
| 8,960,049 | B2* | 2/2015 | Murayama | B60T 7/042 180/315 |
| 8,991,566 | B2* | 3/2015 | Pozivilko | F16D 65/095 188/73.31 |
| 9,663,087 | B2* | 5/2017 | Bacardit | B60T 13/5675 |
| 2014/0373526 | A1 | 12/2014 | Ohnishi et al. | |
| 2018/0273011 | A1* | 9/2018 | Wingender | F16H 19/04 |
| 2019/0047530 | A1* | 2/2019 | Nagel | B60T 13/745 |
| 2019/0092298 | A1* | 3/2019 | Bach | B60T 7/04 |
| 2019/0152462 | A1* | 5/2019 | Panunzio | B60T 11/18 |

FOREIGN PATENT DOCUMENTS

| | | | | |
|---|---|---|---|---|
| CN | 209566905 U | | 11/2019 | |
| EP | 3350041 B1 | * | 2/2020 | ............ B60T 13/575 |

OTHER PUBLICATIONS

CN103832424A (Year: 2014).*
DE102013016912A1 (Year: 2015).*
DE102015220033A1 (Year: 2016).*
JP2016060446A (Year: 2016).*
WO2017045805A1 (Year: 2017).*
WO2018153710A1 (Year: 2018).*
KR101738053 B1 (Year: 2017).*
WO 2019100375 A1 (Year: 2019).*
CN 103879396 A (Year: 2014).*
Chinese Office Action dated May 27, 2023, issued in corresponding Chinese Patent Application No. 2021101793994.

* cited by examiner

ELECTROMECHANICAL BRAKING APPARATUS

CROSS-REFERENCE TO RELATED APPLICATION

This application is based on, and claims priority from, Korean Patent Application Number 10-2020-0018874, filed Feb. 17, 2020, the disclosure of which is incorporated by reference herein in its entirety.

TECHNICAL FIELD

The present disclosure in at least one embodiment relates to an electromechanical braking apparatus.

BACKGROUND

The statements in this section merely provide background information related to the present disclosure and do not necessarily constitute prior art.

In a running vehicle, the driver's brake-pedal depression alone may be short of applying sufficient braking force to stop the vehicle. Therefore, a booster is used to boost the pedal effort of the driver. Types of boosters include vacuum boosters, hydraulic boosters, and electromechanical boosters.

The vacuum booster is a booster with a generally vacuous interior, which lets air sucked in when the driver presses the brake pedal to boost the pedal effort.

The hydraulic booster provides boosting power by applying hydraulic pressure to the hydraulic fluid by using a motor and a pump.

The electromechanical booster includes a motor and a gear mechanism configured to transmit a driving force generated by the motor. The gear mechanism provides a boost by pressing a master cylinder plunger.

The conventional electromechanical booster employs a tie rod method, that is, a single support structure, to support the reaction force generated by the hydraulic pressure of brake oil inside the master cylinder.

Where the electromechanical booster incorporates a tie rod method, the booster suffers from layout limitation because its design is constrained by the position and measurement of the tie rods. Further, the need for a nut and other sealing members for fixing the tie rod makes it difficult to provide more compact boosters.

Besides, the booster device becoming large and complex leads to the issue of amplified gear noise.

SUMMARY

According to at least one embodiment, the present disclosure provides an electromechanical braking apparatus including a rod, a master cylinder, a motor, and a gear mechanism. The rod is configured to translate in response to a depression of a brake pedal. The master cylinder is configured to receive brake oil and to be responsive to the insertion of the rod for discharging the brake oil. The gear mechanism has at least some part connected to the master cylinder and at least some other part connected to the motor. Here, the gear mechanism includes an upper housing and a lower housing. The upper housing is configured to receive at least some portion of a plurality of gears. The lower housing is coupled to the upper housing and configured to receive at least some other portion of the plurality of gears.

REFERENCE NUMERALS

Figure 1:
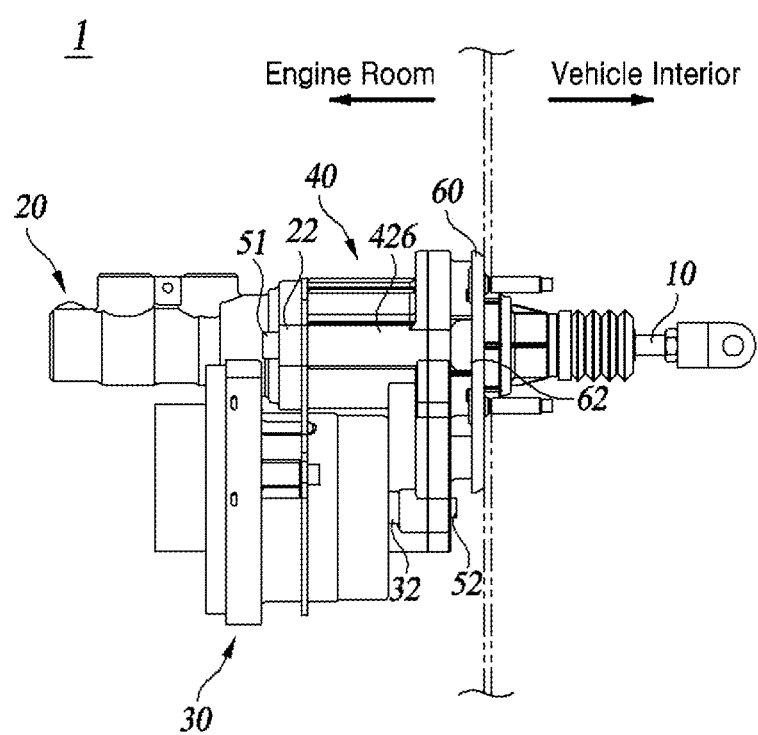
FIG. 1 is a side view of an electromechanical braking apparatus according to at least one embodiment of the present disclosure.

| | |
|---|---|
| 1: braking apparatus | 10: rod |
| 20: master cylinder | 30: motor |
| 40: gear mechanism | 42: upper housing |
| 44: lower housing | 46a: first upper support |
| 47a: first lower support | 48b: second upper support |
| 49b: second lower support | 51, 52, 53: bolt |
| 60: bracket | |

DETAILED DESCRIPTION

Accordingly, the present disclosure seeks to provide an electromechanical braking apparatus that is free to make design changes toward higher freedom of layout and is advantageous in cost reduction by obviating the need for including a sealing member among other fixing elements.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when a part 'includes' or 'comprises' a component, the part is meant to further include other components, not excluding thereof unless there is a particular description contrary thereto.

The present disclosure provides a braking apparatus 1 with a gear mechanism 40 having a plurality of gears, screws, and nuts, the configuration and arrangement of which, however, are generally known to those skilled in the art, and the illustration and description of the internal structural details of the braking apparatus 1 other than the fastening structure thereof will be omitted.

Additionally, in the present disclosure, each of the joints is shown as being bolted but is not limited thereto. For example, each of the joints may be fastened by using a spring clip or a rivet.

It should be noted that a and b included in the reference numerals in the present disclosure are just subscripts for distinguishing left and right, and even if both side portions are distinguished by a and b, they share the same shape and configuration by the common numerical parts in the reference numerals. It should also be noted that either one of a and b being illustrated in the drawings is for convenience of description and concise illustration and that the illustration of one of a and b alone assumes the inclusion of the other, which can be implemented without difficulty by a person skilled in the art.

Figure 2:
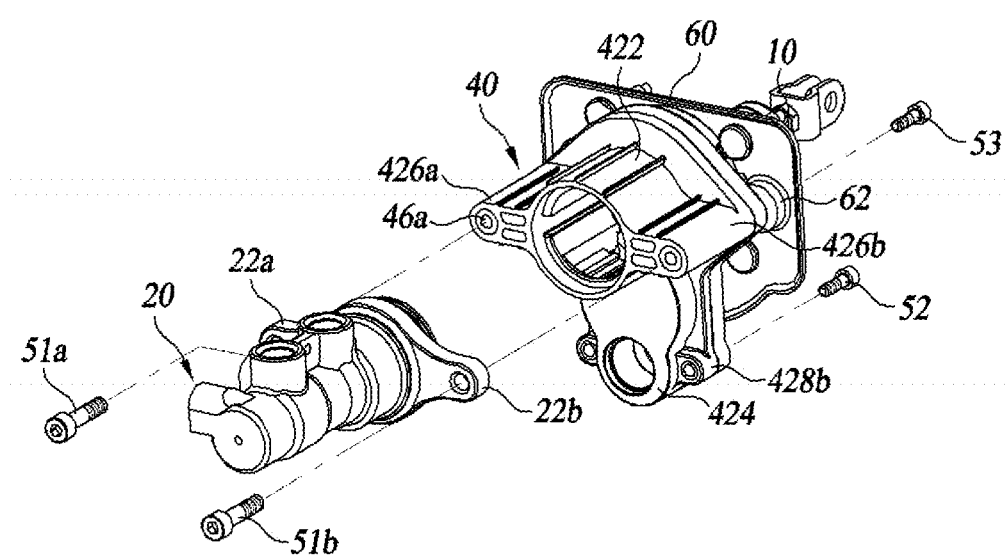
FIG. 2 is an exploded perspective view of an electromechanical braking apparatus according to at least one embodiment of the present disclosure.

FIG. 1 is a side view of an electromechanical braking apparatus according to at least one embodiment of the present disclosure. FIG. 2 is an exploded perspective view of an electromechanical braking apparatus according to at least one embodiment of the present disclosure.

As shown in FIGS. 1 and 2, the electromechanical braking apparatus 1 according to at least one embodiment of the present disclosure includes all or some of a rod 10, a master cylinder 20, a motor 30, the gear mechanism 40, one or more bolts 51, 52, and 53, and a bracket 60.

The rod 10 has one end connected to a brake pedal (not shown) and is configured to perform, when a vehicle driver depresses the brake pedal, translational movement in response to the amount of depression or a stroke on the brake pedal. The rod 10 has the other end connected to at least a part of the master cylinder 20, so that hydraulic pressure may be generated in the brake oil provided inside the master cylinder 20. When the driver depresses the brake pedal, the rod 10 transmits the pedal effort to a piston (not shown) of the master cylinder 20, and the brake oil inside the master cylinder 20 is discharged therefrom to provide braking force to one or more wheels (not shown).

The master cylinder 20 is approximately elongated and contains brake oil therein. The master cylinder 20 is in fluid communication with a reservoir (not shown) and at least one conduit (not shown). When the rod 10 moves linearly toward the master cylinder 20, the brake oil in the master cylinder 20 is compressed. The hydraulic pressure generated by the compression of the internal space accommodating the brake oil is transmitted to one or more wheels to brake the running vehicle.

The master cylinder 20 includes one or more first joints 22a and 22b (or collectively 20). The first joints 22 may protrude in radially outward directions from at least one surface of the master cylinder 20. However, the present disclosure is not necessarily limited thereto, and the first joints 22 may have various shapes. For example, the first joints 22 may protrude not radially outwardly but toward the gear mechanism 40 from at least one surface of the master cylinder 20.

The first joints 22 may be bolted to at least some of the gear mechanism 40, in particular, one or more first upper joints 426a and 426b (or collectively 426) by one or more first bolts 51a and 51b (or collectively 51). This allows the master cylinder 20 and the gear mechanism 40 to be fixed to each other.

Meanwhile, not a sufficient braking force may be provided only by depressing the driver's brake pedal. The motor 30 and gear mechanism 40 boost the pressure applied to the master cylinder 20 to provide supplemental pressure for braking.

The motor 30 is driven with power applied. Although not shown, an electronic control unit (ECU) calculates the pressure required for braking based on the driver's pedal stroke, steering angle, vehicle speed, and yaw rate. For the motor 30 to generate the required pressure, the ECU causes the motor 30 to be powered and thereby driven.

The motor 30 includes one or more second joints 32.

The second joints 32 may protrude from one surface of the motor 30 toward the gear mechanism 40 and be bolted to at least some of the gear mechanism 40, in particular, one or more second upper joints 428b by the second bolts 52. This allows the motor 30 and the gear mechanism 40 to be fixed to each other.

The gear mechanism 40 transmits the driving force generated by the motor 30 to the master cylinder 20, thereby boosting the pedal effort of the driver. To this end, the gear mechanism 40 has a cylinder insertion portion 422 and a motor insertion portion 424 for connecting the gear mechanism 40 to the master cylinder 20 and the motor 30, respectively.

The cylinder insertion portion 422 is connected to the master cylinder 20 by receiving at least some portion of the master cylinder 20 inserted therein. This embodiment illustrates that at least some portion of the master cylinder 20 is inserted into the gear mechanism 40. However, the present disclosure is not necessarily limited to this configuration, and the gear mechanism 40 may have at least some portion configured to be inserted into the master cylinder 20.

The motor insertion unit 424 is connected to the motor 30 by receiving inserting at least some portion of the motor 30 inserted therein. This embodiment illustrates that at least some portion of the motor 30 is inserted into the gear mechanism 40. However, the present disclosure is not necessarily limited to this configuration, and the gear mechanism 40 may have at least some portion configured to be inserted into the motor 30. The gear mechanism 40 may transmit the force generated from the motor 30 to the master cylinder 20. To this end, the gear mechanism 40 contains one or more gears in an accommodation space formed therein.

The gear mechanism 40 may be at least partially made of synthetic resin. When made of synthetic resin, the gear mechanism 40 may be easy to form and can reduce the manufacturing cost.

The bracket 60 has at least some portion coupled with the gear mechanism 40 and at least some other portion fixed to a dashboard 70 of the vehicle. The bracket 60 includes third joints 62 protruding from one surface thereof toward the gear mechanism 40. The third joints 62 may be bolted to the first upper joints 426a and 426b of the gear mechanism 40 by the third bolts 53. This allows the bracket 60 and the gear mechanism 40 to be fixed to each other.

The following will describe in detail the shape and structure of the gear mechanism 40.

Figure 3:
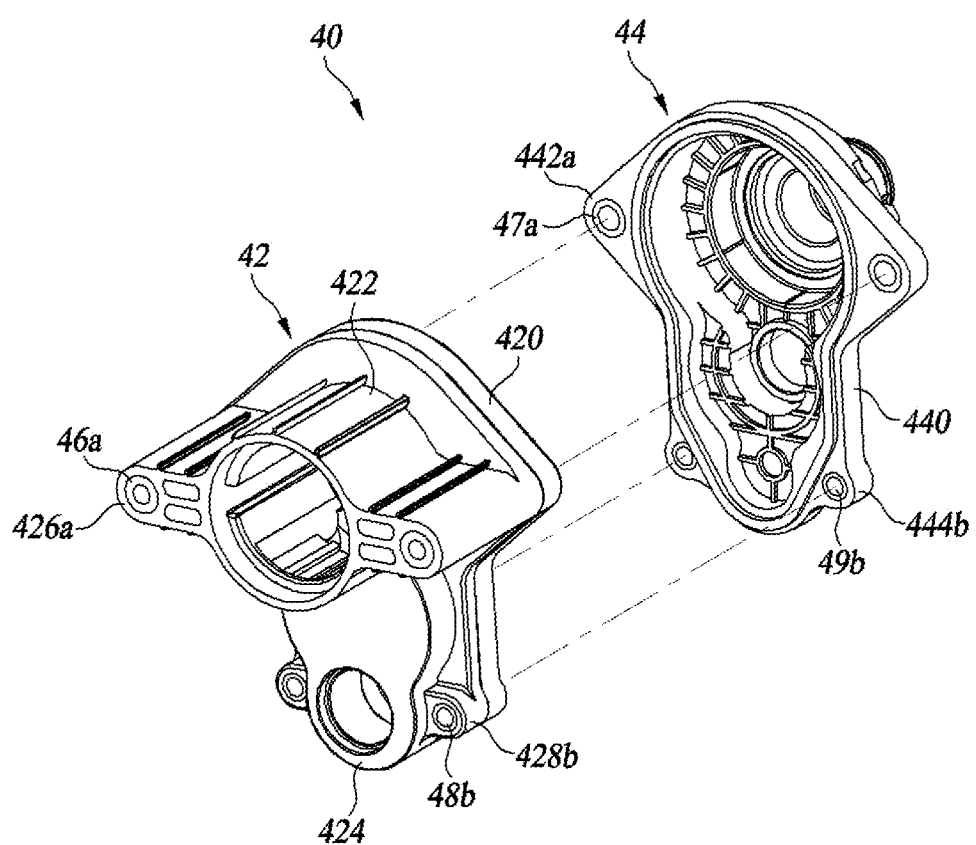
FIG. 3 is an exploded perspective view of a gear mechanism according to at least one embodiment of the present disclosure.

FIG. 3 is an exploded perspective view of a gear mechanism according to at least one embodiment of the present disclosure.

As shown in FIG. 3, the gear mechanism 40 according to at least one embodiment of the present disclosure includes all or some of an upper housing 42, a lower housing 44, one or more first upper supports 46a, one or more first lower supports 47a, one or more second upper supports 48b, and one or more second lower supports 49b.

The upper housing 42 is fastened with the master cylinder 20 and the motor 30 and is configured to accommodate at least some portion of the plurality of gears therein.

The upper housing 42 includes all or some of a first base 420, the cylinder insertion portion 422, the motor insertion portion 424, one or more first upper joints 426a and 426b, and one or more second upper joints 428b.

The first base 420 faces at least one surface of the lower housing 44 and is approximately planar.

The cylinder insertion portion 422 protrudes toward the master cylinder 20 from one surface of the first base 420. The cylinder insertion portion 422 is a portion into which at least some portion of the master cylinder 20 is inserted, and the inner circumferential surface of the cylinder insertion portion 422 conforms to the outer circumferential surface of the master cylinder 20. Meanwhile, at a portion where the cylinder insertion portion 422 is coupled to the master cylinder 20, an O-ring (not shown) or such sealing member may be disposed for sealing.

The motor insertion portion 424 of the upper housing 42 protrudes from one surface of the first base 420 toward the motor 30, and it may be disposed adjacent to the cylinder insertion portion 422. The motor insertion portion 424 is a portion into which at least some portion of the motor 30 is inserted, and an inner circumferential surface of the motor insertion portion 424 conforms to the outer circumferential surface of the motor 30. Meanwhile, at a portion where the motor insertion portion 424 is coupled to the motor 30, a sealing member for sealing, such as an O-ring, may be disposed.

The one or more first upper joints 426a and 426b protrude from one surface of the first base 420 in parallel with the protruding direction of the cylinder insertion portion 422. The first upper joint 426a is formed in an approximately hollow column shape. One end of the first upper joint 426a is configured to be bolted to the first joint 22a of the master cylinder 20 and the first bolt 51a. Since the first upper joints 426a and 426b are fastened with the first joints 22a, the master cylinder 20 and the gear mechanism 40 may be fixed to each other.

One or more second upper joints 428b protrude from one surface of the first base 420 in parallel with the protruding direction of the motor insertion portion 424. The second upper joint 428b is formed in an approximately hollow column shape. The second upper joints 428b each have one end configured to be bolted to the second joint 32 of the motor 30 by the second bolt 52. Since the second upper joints 428b are fastened with the second joints 32, the motor 30 and the gear mechanism 40 may be fixed to each other.

The lower housing 44 has at least some portion fastened with the upper housing 42 and at least some other portion fastened with the bracket 60. The lower housing 44 is configured to accommodate at least some other portion of the plurality of gears therein.

The lower housing 44 includes a second base 440, one or more first lower joints 442a, and one or more second lower joints 444b.

At least some portion of the second base 440 is configured to face the first base 420.

The first lower joints 442a protrude from one surface of the second base 440 in radially outward directions of the second base 440. One end of The first lower joints 442a each have one end configured to face the other end of the first upper joint 426a and the other end configured to face the third joint 62 of the bracket 60.

The first upper joints 426a, 426b and the first lower joints 442a of the gear mechanism 40 may be bolted to the third joints 62 of the bracket 60 by the third bolts 53. Since the first lower joints 442a are fastened with the first upper joints 426a and the third joints 62, the gear mechanism 40 may be fixed to the bracket 60.

The one or more second lower joints 444b protrude from one surface of the second base 440 in radially outward directions of the second base 440. At this time, the second lower joints 444b may each have one end configured to face the other end of each of the second upper joints 428b. The second lower joints 444b may be bolted to the second upper joints 428b by the second bolts 52. Since the second lower joints 444b are fastened with the second upper joints 428b, the upper housing 42 and the lower housing 44 may be more securely fastened together.

The first upper supports 46a are inserted into the first upper joints 426a. The outer circumferential surface of the first upper supports 46a conforms to the inner circumferential surface of the first upper joints 426a which are substantially hollow columnar. The first upper supports 46a extend in the extending direction of the first upper joints 426a and preferably extend over the same length as the first upper joints 426a.

The first upper supports 46a may have at least some portion formed of steel material. When the upper housing 42 and the lower housing 44 are made of synthetic resin, they may not sufficiently support the reaction force against the hydraulic pressure generated in the process of compressing the brake oil in the master cylinder 20. At this time, with the first upper supports 46a, which have a relatively greater mechanical strength than the synthetic resin, inserted into the first upper joints 426a, the reaction force to the hydraulic pressure may be supported more securely. As with the first upper supports 46a being formed of steel, the same functional steel material may be used to form the first lower supports 47a, second upper supports 48b, and second lower supports 49b.

The first upper supports 46a each have one end in which the first bolt 51 is inserted and the other end in which at least some portion of the third bolt 53 is inserted. When the bolts are fastened to both ends of the first upper supports 46a, nuts (not shown) may be further included between the bolts and at least some portion of the outer surface of the housing assembly 42 and 44. The first upper supports 46a may further include threads (not shown) at portions into which the bolts 51 and 53 are inserted.

The first lower supports 47a are each inserted into each of the first lower joints 442a. The outer circumferential surface of the first lower support 47a conforms to the inner circumferential surface of the first lower joint 442a and has a substantially hollow columnar shape. The first lower supports 47a extend in parallel with and preferably along the length of the first lower joints 442a.

The reaction force by the hydraulic pressure generated from the master cylinder 20 is transmitted to the first upper supports 46a of the gear mechanism 40, and the reaction force is also transmitted to the first lower supports 47a. The first lower supports 47a each have one end supported by the bracket 60. Accordingly, the reaction force transmitted to the first lower supports 47a is transferred to the bracket 60 and the dashboard 70 so that the gear mechanism 40 can effectively support the reaction force.

Since the support for the reaction force of the hydraulic pressure is established with distributed substructures rather than a single unitary structure, the gear mechanism 40 may be made smaller. As the housing 42 and 44 becomes larger, the space increases, which may amplify noise generated by a plurality of gears, screws, nuts, and the like. In other words, the gear mechanism 40 when made smaller effects relatively reduced noise.

The second upper supports 48b are inserted into the second upper joints 428b. The outer circumferential surface of each second upper support 48b conforms to the inner circumferential surface of each second upper joint 428b, and the second upper support 48b has a substantially hollow columnar shape. The second upper supports 48a extend in parallel with and preferably along the length of the second upper joints 428b.

When the second upper joint 428b is exposed to vibration frequently or for an extended time, deformation may occur in at least a part of the second upper joint 428b. At this time, since the gear mechanism 40 according to the present disclosure includes the second upper supports 48b, structural robustness in the joint areas can be improved. Specifically, the second upper support 48b may prevent deformation of the upper housing 42 due to vibration generated by the motor 30.

The second lower supports 49b are each inserted into each of the second lower joints 444b. The outer circumferential surface of each second lower support 49b conforms to the inner circumferential surface of each second lower joint 444b, and the second lower support 49b has a substantially hollow columnar shape. The second lower supports 49a extend in parallel with and preferably along the length of the second lower joints 444b.

The second lower support 49b supports vibration generated by the motor 30 transmitted from the second upper support 48b as well as stress due to the vibration.

At least some portion of the second bolt 52 is inserted into the second upper support 48b and the second lower support 49b. The second upper supports 48b and the second lower supports 49b may further include threads (not shown) at portions into which the second bolts 52 are inserted.

Further, each of the supports 46a, 47a, 48b, and 49b and each of the housing segments 42 and 44 may be integrally manufactured by double injection molding.

Figure 4:
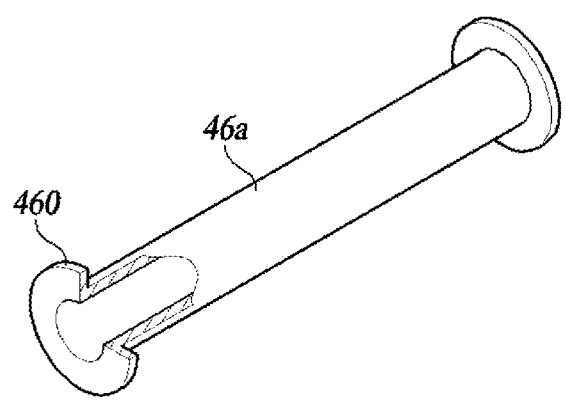
FIG. 4 is a perspective view of a first upper support according to at least one embodiment of the present disclosure.

FIG. 4 is a perspective view of first upper support according to at least one embodiment of the present disclosure.

As shown in FIG. 4, a specific shape of the first upper support 46a will be described in detail. Since the second upper supports 48b, the first lower supports 47a, and the second lower supports 49b are generally equivalent in shape and configuration to the first upper support 46a except for differences in length and diameter, the reader may refer to the description of FIG. 4 here for the particular shapes of the respective supports.

The first upper support 46a is formed in an approximately elongated shape, and it may include one or more fixing flanges 460 at one or both ends thereof.

The first upper support 46a may include the one or more end fixing flanges 460, so the first upper support 46a can be securely fixed to the first upper joint 426a and positively held therein against dislodgement.

Further, the fixing flanges 460 can prevent contaminants and the like from flowing out of a relevant engine room into the first upper joint 426a and the first upper support 46a. Since no separate sealing member is required for sealing, the manufacturing cost of the braking apparatus 1 can be reduced.

As described above, according to at least one embodiment of the present disclosure, since the load-bearing structure is established with distributed substructures, the electromechanical braking apparatus has higher freedom of layout to make the apparatus smaller. Further, simplified components of the downsized apparatus result in reduced noise issues.

Further, removing sealing members of the gear mechanism provides a cost reduction.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. An electromechanical braking apparatus, comprising:
   a rod configured to translate in response to a depression of a brake pedal;
   a master cylinder configured to receive brake oil and to be responsive to an insertion of the rod for discharging the brake oil;
   a motor; and
   a gear mechanism having at least some part connected to the master cylinder and at least some other part connected to the motor, wherein the gear mechanism comprising:
   an upper housing configured to receive at least some portion of a plurality of gears, and
   a lower housing coupled to the upper housing and configured to receive at least some other portion of the plurality of gears,
   wherein the upper housing comprises:
      a first base having one surface formed to face at least some part of the lower housing;
      a cylinder insertion portion protruding from the first base toward the master cylinder to be coupled with at least some part of the master cylinder;
      one or more first upper joints each protruding parallel to an axial direction of the cylinder insertion portion and having one end formed to be bolted to the at least some part of the master cylinder; and
      one or more first upper supports each inserted into the one or more first upper joints and having at least some portion formed of a material different from a material of the upper housing, and
      wherein different bolts are coupled to both ends of each of the one or more first upper supports.

2. The electromechanical braking apparatus of claim 1, wherein
   the upper housing further comprises:
   a motor insertion portion protruding from the first base toward the motor and formed corresponding to an outer circumferential surface of at least some part of the motor to be coupled with the at least some part of the motor,
   wherein the cylinder insertion portion is formed corresponding to an outer circumferential surface of the master cylinder.

3. The electromechanical braking apparatus of claim 2, wherein the upper housing further comprises:
   one or more second upper joints each protruding from one surface of the first base in parallel with an axial direction of the motor insertion portion and protruding from an outer circumferential surface of the motor insertion portion in a radially outward direction, the one or more second upper joints each having one end formed to be bolted to the at least some part of the motor; and
   one or more second upper supports each inserted into the one or more second upper joints.

4. The electromechanical braking apparatus of claim 3, further comprising: a bracket fastened to a dashboard of a vehicle and configured to be coupled with at least some part of the lower housing to support the lower housing.

5. The electromechanical braking apparatus of claim 4, wherein the lower housing comprises:
   a second base configured to face the first base of the upper housing;

one or more first lower joints each protruding from one surface of the second base in a radially outward direction of the second base and formed to be bolted to the bracket and the one or more first upper joints of the upper housing; and one or more first lower supports inserted into the one or more first lower joints.

6. The electromechanical braking apparatus of claim 5, wherein the lower housing further comprises:

one or more second lower joints each protruding from the one surface of the second base and protruding from an outer circumferential surface of the second base in a radially outward direction, the one or more second lower joints each having one end formed to be bolted to an opposite end of the one or more second upper joints of the upper housing; and one or more second lower supports inserted into the one or more second lower joints.

7. The electromechanical braking apparatus of claim 2, wherein the first upper support has one end formed with a fixing flange, a diameter of which is greater than that of a body part of the first upper support.

8. The electromechanical braking apparatus of claim 7, wherein the first upper support has an opposite end formed with an opposite fixing flange, a diameter of which is greater than that of the body part of the first upper support.

9. The electromechanical braking apparatus of claim 2, wherein the upper housing and the one or more first upper supports are double-injection molded together.

10. The electromechanical braking apparatus of claim 5, wherein the one or more first lower supports has the same length as the one or more first lower joints.

11. The electromechanical braking apparatus of claim 5, wherein a material of the one or more first lower supports is different from and has relatively greater mechanical strength than a material of the one or more first lower joints.

12. The electromechanical braking apparatus of claim 11, wherein the one or more first lower supports includes steel, and the one or more first lower joints includes synthetic resin.

13. The electromechanical braking apparatus of claim 1, wherein a material of the one or more first upper supports is different from and has relatively greater mechanical strength than a material of the one or more first upper joints.

14. The electromechanical braking apparatus of claim 13, wherein the one or more first upper supports includes steel, and the one or more first upper joints includes synthetic resin.

* * * * *